United States Patent Office 2,741,072
Patented Apr. 10, 1956

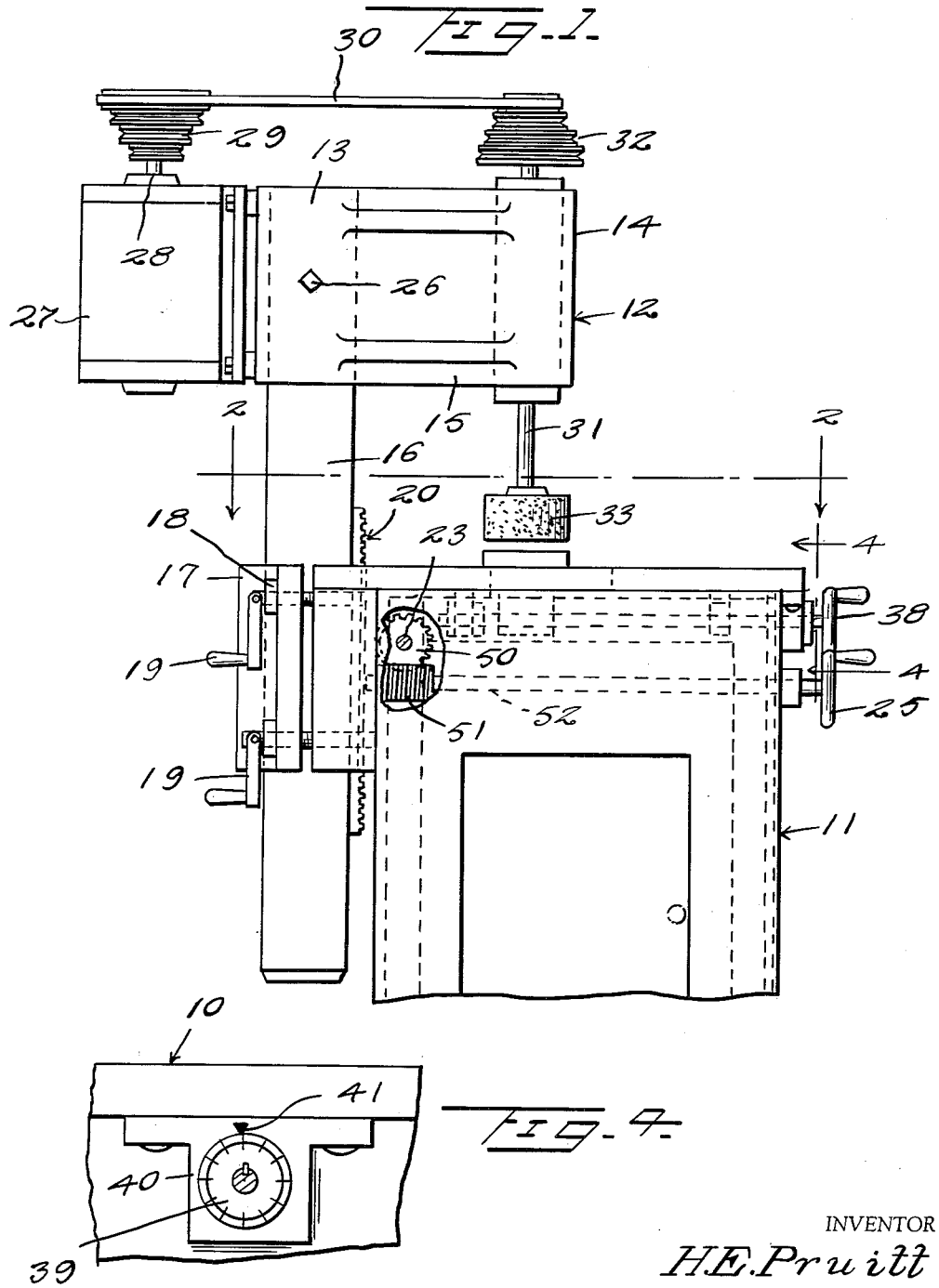

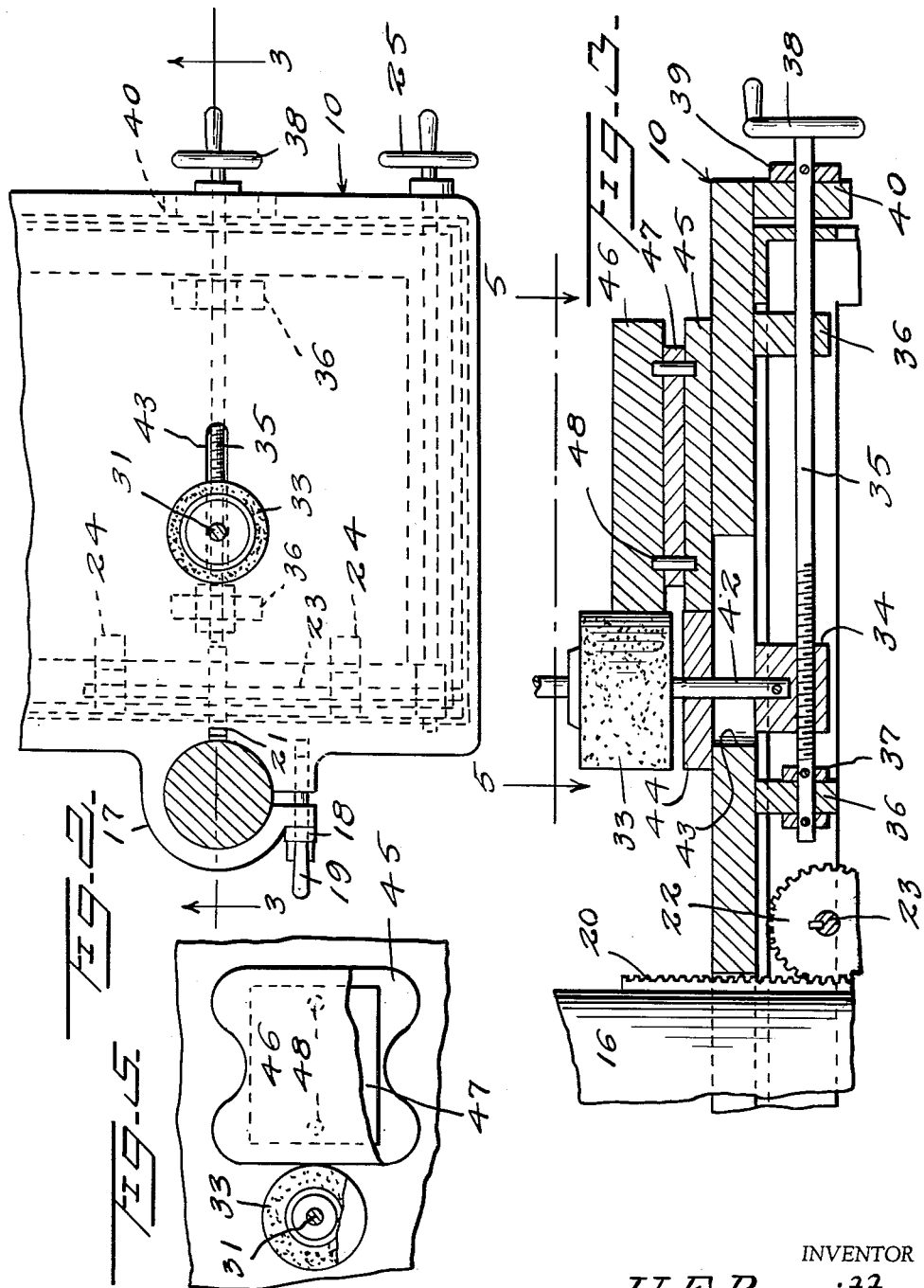

2,741,072

GRINDING MACHINE

Harvey E. Pruitt, Cheboygan, Mich.

Application September 21, 1953, Serial No. 381,152

1 Claim. (Cl. 51—101)

This invention relates to a machine for grinding or cutting dies.

An object of this invention is to provide a machine embodying a table with a grinder or cutter supported over the table, and with a rotatable templet guide on the table against which a die carrying templet is adapted to engage. The templet comprises a duplicating member to which the die is adapted to be secured. With the templet precision made, the die secured to the templet will be precision ground and any number of similar dies may be duplicated to the same precision degree.

Another object of this invention is to provide in a machine of this kind a rotatable guide for the templet which is radially adjustable relative to the grinding wheel or cutter so that the die work piece can be formed either larger or smaller than the templet or may be formed to the exact size of the templet.

A further object of this invention is to provide a machine of this kind including an improved means for vertically shifting the head and locking the same in adjusted position.

With the above and other objects in view, my invention consists in the arrangement, combination and details of construction disclosed in the drawings and specification, and then more particularly pointed out in the appended claim.

In the drawings:

Figure 1 is a detail side elevation, partly broken away of a grinding machine constructed according to an embodiment of my invention, Figure 2 is a fragmentary horizontal section taken on the line 2—2 of Figure 1, Figure 3 is a fragmentary vertical section taken on the line 3—3 of Figure 2, Figure 4 is a fragmentary sectional view taken on the line 4—4 of Figure 1, Figure 5 is a fragmentary horizontal section taken substantially on the line 5—5 of Figure 3.

Referring to the drawing, the numeral 10 designates generally a horizontally disposed table which is mounted on the upper end of a frame structure 11. The table 10 has mounted thereabove a spindle head generally designated as 12, the spindle head 12 comprising a bushing 13, a spindle bearing 14 disposed forwardly of the bushing 13 and connected to the latter by means of a supporting web 15.

The bushing 13 is secured to the upper end of a vertically adjustable post 16 which extends through a split clamping bushing 17 carried by the rear of the table 10. The bushing 17 is adapted to be tightly clamped on the post 16 by means of a pair of threaded clamping screws 18 having swingable crank members 19 at their rear or outer ends. The post 16 is held against horizontal turning and is vertically adjustable relative to the bushing 17 by means of an elongated rack bar 20 which extends through a keyway 21 formed in the bushing 17.

A spur gear 22 is mounted on a shaft 23 which is journalled in bearings 24 secured to the lower side of the table 10, and shaft 23 has secured thereto a worm gear 50. A worm 51 fixed to a shaft 52 meshes with worm gear 50 and shaft 52 has secured thereto a wheel or crank 25. The spur gear 22 meshes with the rack 20 so that rotation of the shaft 23 and the gear 22 will effect vertical adjustment of the post 16. The bushing 13 is adapted to be fixed against endwise movement relative to the post 16 by fastening means 26, and the bushing 13 has fixed to the rear side thereof a motor or power member 27.

The motor or power member 27 has secured to the shaft 28 thereof a stepped and grooved pulley 29 about which a belt is trained. A vertically disposed spindle 31 is rotatably mounted in the bearing 14 and has secured to the upper end thereof a grooved and stepped pulley 32 about which the belt 30 is trained. The spindle 31 has secured to the lower end thereof an abrading member or grinding wheel 33 which overlies the upper side of the table 10.

A carriage 34 is disposed below the table 10 and has threaded therethrough, a carriage adjusting screw shaft 35 which is journalled through a pair of bearings 36 in a free non-threaded fit and the bearings are secured to the lower side of the table 10. The shaft 35 has secured thereto a pair of collars 37 disposed on opposite sides of one of the bearings 36 so that the shaft 35 will be held against endwise movement. The outer end of the shaft 35 has secured thereto a crank or handwheel 38, and a graduated dial 39 is secured to the shaft 35 in a position confronting the outer bearing bracket 40 secured to the lower side of the table 10. The bearing bracket 40 is formed with a pointer 41 adjacent the periphery of the dial 39 so that the shaft 35 can be rotatably adjusted to a precision degree.

The carriage 34 has secured thereto an upwardly extending or vertical pin 42 which extends through an elongated slot 43 which is disposed radially of the vertical axis of the spindle 31. The pin or stud 42 extends slightly above the top of the table 10 and has rotatably mounted thereon a templet guide 44 of disc-shape. The guide 44 is herein shown as being of a diameter substantially equal to the diameter of the abrading wheel 33.

A templet 45 of suitable configuration is adapted to slidably engage on the upper side of the table 10, bearing at its marginal edge against the guide 44. A die or work piece 46 is mounted on the templet 45 and in the present instance the die 46 is mounted on a spacer plate 47 interposed between the templet 45 and the lower side of the die 46 so that no portion of the die 46 will engage the templet guide 44. The die 46 is held against movement relative to the templet 45 by means of dowels 48 or other suitable fastening means.

In the use and operation of this invention, the head 12 carrying the rotatable abrading member 33 and power member 27 is vertically adjusted to dispose the abrading member 33 in vertically spaced relation to the templet guide 44. The guide 44 is radially adjusted relative to the abrading wheel 33 by rotation of the adjusting shaft 35 to align the spindle with the stud 42. The templet 45 carrying the die 46 which is to be ground is then engaged with the rotatable templet guide 44. The templet is then moved in a manner so that the perimeter of the templet 45 will move along the guide 44. At this time the die or work piece 46 will be contacted by the abrading wheel 33 so that the die 46 will be ground in a precision manner to the same configuration and dimension of the templet 45.

What I claim is:

A grinding machine comprising a substantially rectangular base having opposed front and rear ends, a table carried by said base, a split clamp fixedly secured to said rear end of said base, an elongated post slidably mounted in said clamp and being held in adjusted position thereby, said clamp having a vertical keyway formed therein, a vertically extending gear rack fixedly secured to said post, said rack confronting said keyway and having a portion thereof normally extending therethrough, said gear rack being movable through said keyway, a shaft mounted for rotation on said base and having an operating handle fixedly secured to one of its ends, a spur gear fixedly secured to the other end of said shaft and meshing with said gear rack whereby rotation of said handle effects vertical adjustment of said post, a bushing fixedly secured to the upper end of said post, motor means fixedly mounted on said bushing, a drive shaft for said motor means, a spindle rotatably mounted on said bushing and provided with upwardly projecting and downwardly depending ends, variable speed means connecting said drive shaft with said upwardly projecting end of said spindle in driving relation, said table having an elongated slot extending therethrough, said downwardly depending end of said spindle registering with said slot in spaced relation relative thereto and having an abrasive wheel fixedly secured thereto for rotation therewith, an elongated shaft mounted for rotation on said base below said table with its longitudinal axis in spaced parallel relation with respect to the longitudinal axis of said slot, said second shaft having an operating handle at one of its ends and being externally threaded at its other end, a carriage receiving said threaded end of said second shaft whereby rotation of said handle mounted thereon effects axial adjustment of said carriage relative thereto, said carriage being normally held in adjusted position below said slot, said carriage having a bore formed therein with the axis thereof disposed at right angles with respect to the longitudinal axis of said slot, a pin having one of its ends fixedly secured in said bore and having a template disc-shaped guide rotatably mounted on the other end thereof, said pin extending through said slot to position said guide above said table, and said pin being movable in a plane passing through the axis of said spindle.

References Cited in the file of this patent
UNITED STATES PATENTS

| | | |
|---|---|---|
| 1,211,381 | Alden | Jan. 9, 1917 |
| 2,004,738 | White | June 11, 1935 |
| 2,142,863 | Whitney | Jan. 3, 1939 |
| 2,365,302 | Shutt | Dec. 19, 1944 |
| 2,519,542 | Carey et al. | Aug. 22, 1950 |
| 2,555,048 | Long | May 29, 1951 |